US007844554B2

(12) United States Patent

Kummer, Jr. et al.

(10) Patent No.: US 7,844,554 B2

(45) Date of Patent: Nov. 30, 2010

(54) METHOD AND SYSTEM FOR REMOTE FEATURE ENABLING AND DISABLING IN A MAILING SYSTEM

(75) Inventors: Robert H. Kummer, Jr., Southbury, CT (US); Linda S. Lin, Easton, CT (US); Lynn W. D'Amico, Higganum, CT (US); Wesley A. Kirschner, Hamden, CT (US)

(73) Assignee: Pitney Bowes Inc., Stamford, CT (US)

( * ) Notice: Subject to any disclaimer, the term of this patent is extended or adjusted under 35 U.S.C. 154(b) by 1945 days.

(21) Appl. No.: 10/823,032

(22) Filed: Apr. 13, 2004

(65) Prior Publication Data

US 2005/0165703 A1 Jul. 28, 2005

Related U.S. Application Data

(60) Provisional application No. 60/538,553, filed on Jan. 23, 2004.

(51) Int. Cl.
*G06F 9/00* (2006.01)

(52) U.S. Cl. ...................................................... 705/410

(58) Field of Classification Search ....................... None
See application file for complete search history.

(56) References Cited

U.S. PATENT DOCUMENTS

| | | | |
|---|---|---|---|
| 4,122,532 A | 10/1978 | Dlugos et al. | |
| 5,077,660 A | 12/1991 | Haines et al. | |
| 5,107,455 A | 4/1992 | Haines et al. | |
| 5,369,401 A | 11/1994 | Haines | |
| 5,442,541 A | 8/1995 | Hube et al. | |
| 5,612,884 A | 3/1997 | Haines | |
| 5,710,706 A | 1/1998 | Markl et al. | |
| 5,956,505 A | 9/1999 | Manduley | |
| 6,477,243 B1 * | 11/2002 | Choksi et al. | 379/100.06 |
| 6,490,684 B1 | 12/2002 | Fenstemaker et al. | |
| 6,694,384 B1 | 2/2004 | Moeller et al. | |
| 2001/0043516 A1 | 11/2001 | Gelfer et al. | |
| 2002/0133471 A1 * | 9/2002 | Eskandari et al. | 705/401 |
| 2002/0176111 A1 * | 11/2002 | Shaw et al. | 358/1.18 |
| 2003/0101148 A1 * | 5/2003 | Montgomery et al. | 705/404 |

OTHER PUBLICATIONS

"Postal regs deliver innovation.", Avery, Susan, Purchasing, v123, n2, p88(4), Aug. 14, 1997.*

* cited by examiner

*Primary Examiner*—Rutao Wu
(74) *Attorney, Agent, or Firm*—Brian A. Lemm; Angelo N. Chaclas

(57) ABSTRACT

A system and method to remotely enable and disable features in a mailing system is provided. When a customer desires to change the operating features of a mailing system, the customer places an order with a data center. The data center generates a file that identifies each of the features that should be enabled within the mailing system, and the file is sent to the mailing system, along with any files required to implement and support the enabled features, via a network. The mailing system will store the required files, and purge any files no longer required to implement and support features that are no longer enabled. The enabling and disabling of operating features is thus performed remotely from the data center, and does not require a customer service representative to physically visit the location at which the mailing system is installed.

19 Claims, 2 Drawing Sheets

METHOD AND SYSTEM FOR REMOTE FEATURE ENABLING AND DISABLING IN A MAILING SYSTEM

CROSS-REFERENCE TO RELATED APPLICATIONS

This application claims the benefit of U.S. Provisional Application Ser. No. 60/538,553, filed on Jan. 23, 2004, the specification of which is hereby incorporated by reference.

FIELD OF THE INVENTION

The invention disclosed herein relates generally to mailing systems, and more particularly to a method and system for remotely enabling and disabling features of a mailing system.

BACKGROUND OF THE INVENTION

Mailing systems, such as, for example, a mailing machine, often include different modules that automate the processes of producing articles, such as, for example, mail pieces. Mail pieces can include, for example, envelopes, post cards, flats, and the like. The typical mailing machine includes a variety of different modules or sub-systems each of which performs a different task on the mail piece. The mail piece is conveyed downstream utilizing a transport mechanism, such as rollers or a belt, to each of the modules. Such modules could include, for example, a separating module, i.e., separating a stack of mail pieces such that the mail pieces are conveyed one at a time along the transport path, a moistening/sealing module, i.e., wetting and closing the glued flap of an envelope, a weighing module (either in-line with the transport path or attached as a separate platform device), and a metering/printing module, i.e., applying evidence of postage to the mail piece. The exact configuration of the mailing machine is, of course, particular to the needs of the user.

A control panel device, hereinafter referred to as a User Interface Controller (UIC), performs user interface and control functions for the mailing machine. Specifically, the UIC provides all user interfaces, executes control of the mailing machine and print operations, calculates postage for debit based upon rate tables, provides the conduit for a Postal Security Device (PSD) to transfer postage indicia to the printer, and conducts communications with a data center for postage funds refill, software download, rates download, and market-oriented data capture. The UIC, in conjunction with an embedded PSD, constitutes the system meter that satisfies U.S. information-based indicia postage (IBIP) meter requirements and other international postal regulations regarding closed system meters.

It is generally desirable to provide a single UIC platform for all customers, thereby eliminating the need to manufacture and maintain multiple versions of the UIC. Each UIC will be provided with a set of base operational features. Some additional operational features, above the base set of features, are optional, however, and not all customers will require or desire to have every optional operational feature that may be supported by the mailing machine. Different operating features can include, for example, accounting features, postal service features, weighing features, type and capacity of scales that can be used, the ability to print ad slogans and/or inscriptions on mail pieces, and data capture functionality. Accounting features can include, for example, different levels of accounting based on the number of different accounts that will be supported by the UIC. Postal services could include, for example, confirmation services for mail pieces. Weighing features could include, for example, manual weight entry and differential weighing. Data capture functionality could include, for example, the ability to maintain records for every mail piece processed based on class, postage amount, weight, etc.

Currently, when a customer purchases a mailing system, the UIC is configured to include the base features and, if known at the time of manufacturing, those optional operating features for which the customer has paid. Should a customer desire to add additional features, the customer must contact a Customer Service Representative (CSR) who must then physically visit the site where the mailing system is located. The CSR must place the mailing system into a service mode, contact a supply center to receive activation codes for the new features to be added, and then manually enter these codes into the UIC, using, for example, a keyboard of the UIC. There are problems, however, with the conventional method of enabling features as described above. For example, the manual intervention required by the CSR is both time consuming and adds significant expense for both the customer and mailing system manufacturer. In addition, if a mailing system has been in use for a period of time and numerous additions or updates of features have been performed, it may be difficult to determine which features are currently loaded and enabled in the mailing system. Furthermore, the programs required for each feature to operate must be stored in the UIC. As such, as new features are enabled, the amount of memory space required may be limited, which can negatively impact the overall performance of the memory system. The conventional method of enabling features does not provide any process for optimizing memory space and purging files that are no longer required, thereby freeing memory space for other functions.

Thus, there exists a need for a system and method to remotely enable and disable features in a mailing system that is easy to implement, cost effective, and can optimize the memory space in a mailing system.

SUMMARY OF THE INVENTION

The present invention alleviates the problems associated with the prior art and provides a system and method to remotely enable and disable features in a mailing system that is easy to implement, cost effective, and can optimize the memory space in a mailing system.

In accordance with an embodiment of the present invention, when a customer desires to change the operating features of a mailing system, the customer places an order with a data center. The data center generates a file that identifies each of the features that should be enabled within the mailing system, and the file is sent to the mailing system, along with any files required to implement and support the enabled features, via a network. The mailing system will store the required files, and purge any files no longer required to implement and support any features that are no longer enabled. The enabling and disabling of operating features in a mailing system according to embodiments of the present invention is performed remotely utilizing a data center, and does not require a customer service representative to physically visit the location at which the mailing system is installed.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION OF THE PRESENT INVENTION

Figure 1:
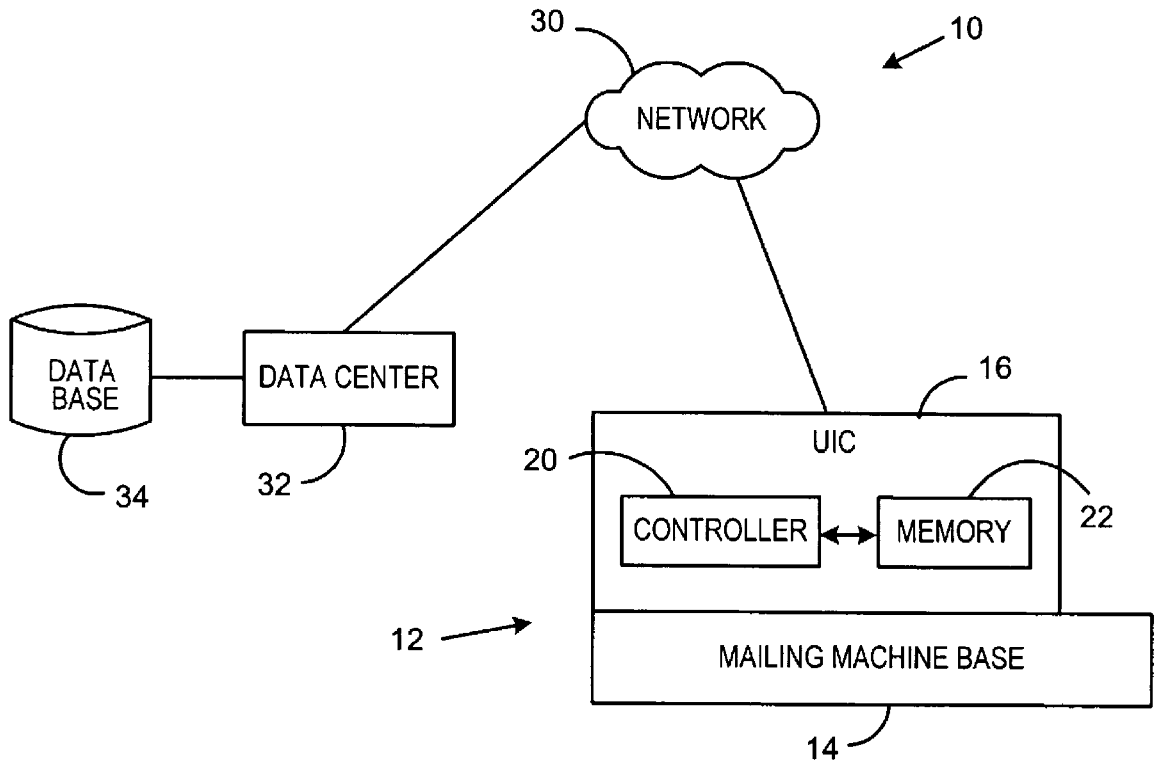
FIG. 1 illustrates a system to remotely enable and disable features in a mailing system according to an embodiment of the present invention.

In describing the present invention, reference is made to the drawings, wherein there is seen in FIG. 1 a system 10 to remotely enable and disable features in a mailing system. The mailing system can be, for example, a mailing machine 12 that includes a mailing machine base 14 and a UIC 16. Mailing machine 12 can include different modules that automate the processes of producing articles, such as, for example, mail pieces. Mail pieces can include, for example, envelopes, post cards, flats, and the like. The mailing machine 12 can include a variety of different modules or sub-systems each of which performs a different task on the mail piece. A mail piece is conveyed downstream utilizing a transport mechanism, such as rollers or a belt, to each of the modules. Such modules could include, for example, a separating module, i.e., separating a stack of mail pieces such that the mail pieces are conveyed one at a time along the transport path, a moistening/sealing module, i.e., wetting and closing the glued flap of an envelope, a weighing module (either in-line with the transport path or attached as a separate platform device), and a metering/printing module, i.e., applying evidence of postage to the mail piece. The exact configuration of the mailing machine 12 is, of course, particular to the needs of the user.

The UIC 16, which includes a controller 20 and memory 22, is coupled to the mailing machine base 14 and provides all user interfaces, executes control of the mailing machine 12 and print operations, calculates postage for debit based upon rate tables, provides the conduit for an embedded Postal Security Device (PSD) to transfer postage indicia to a printer within the mailing machine 12, operates with peripherals for accounting, printing and weighing. Programs that control the operating features of the UIC 16 are stored in the memory 22, which can be, for example, a flash memory or other non-volatile type of memory. The programs are executed by the controller 20, which can be, for example, a general or special purpose processor or the like, and operation of the mailing machine 12 is controlled thereby. The UIC 16 also includes a modem 15 or other communication device that enables it to conduct communications, via a network 30, with a data center 32.

According to an embodiment of the present invention, the operational features of the mailing machine 12 can be changed remotely by the data center 32, without the need for any intervention by a service representative. Every feature is capable of being set to one of four states: permanently disabled, disabled, enabled or permanently enabled. Typically, the UIC 16 is configured for use in a specific country. A feature will be permanently disabled if it can not be used or is not allowed to be used in the country for which the UIC 16 is configured. A feature will be permanently enabled if it is required for operation of the mailing machine 12 in the country for which the UIC 16 is configured. A feature is disabled if the feature is available, but not purchased by the customer, and a feature is enabled if it is available and has been purchased by the customer. Thus, at the time of manufacturing, since it is not generally known which operating features will have been purchased by the customer that is receiving the UIC 16, the operating features of the UIC 16 are generally set to either permanently enabled, permanently disabled, or disabled. Optionally, when the UIC 16 of mailing machine 12 is manufactured, an activation status table of all operational features that may be supported by the mailing machine 12 is stored in the memory 22, and the state of all the features within the table are initialized.

When a customer purchases or leases the mailing machine 12, the customer will specify which operational features are desired, and pay for those features accordingly. The specific UIC 16, identified by a serial number or the like, that will be sent to the customer is associated with the customer's file maintained by the data center 32 in a data base 34. The data center 32 compiles a Customer Configuration Directory (CCD) file, associated with the customer, that includes an indication of all of the operational features that the customer has requested and paid for and thus should be enabled within the mailing machine 12. The CCD file can be stored, for example, in the data base 34 and associated with the customer's file.

When mailing machine 12 is received by the customer and first put into operation, it must communicate with the data center 32. Such communication can occur, for example, via network 32. Upon initialization of the UIC 16 with the data center 32, which can include, for example, identification of the UIC 16 utilizing the serial number and confirmation of the identity of the customer, the data center 32, based on the operating features purchased by the customer as indicated in the customer's file in the data base 34, will determine which operating features should be enabled and thus the operating files, including program files, executable files, data files, library files, etc. necessary for implementation of those features that should be stored in the memory 22 of the UIC 16. For example, a customer may desire to have a level of accounting that provides for 500 different accounts, to perform confirmation services for mail pieces processed by the mailing machine 12, print ad slogans on the mail pieces processed by the mailing machine 12, and utilize an external platform scale with a fifteen pound maximum capability. Each feature is identified by a unique Product Code Number (PCN). The CCD file for the customer will include an entry for each PCN of a purchased feature for that customer's mailing machine 12. The presence of a feature PCN in the CCD file indicates that the associated feature identified by the PCN should be enabled in the mailing machine 12.

The operating files associated with the features purchased by the customer will be downloaded from the data center 32 to the UIC 16, via network 30, and stored by the UIC 16 in the memory 22. These operating files can then be retrieved by the application software for the UIC 16, the operating files activated, e.g., run by the controller 20, and thus the associated features enabled within the mailing machine 12. Additionally, the activation status table (if provided) can be updated to reflect the new status, i.e., enabled, of those features whose operating files have been downloaded to the UIC 16.

Figure 2:
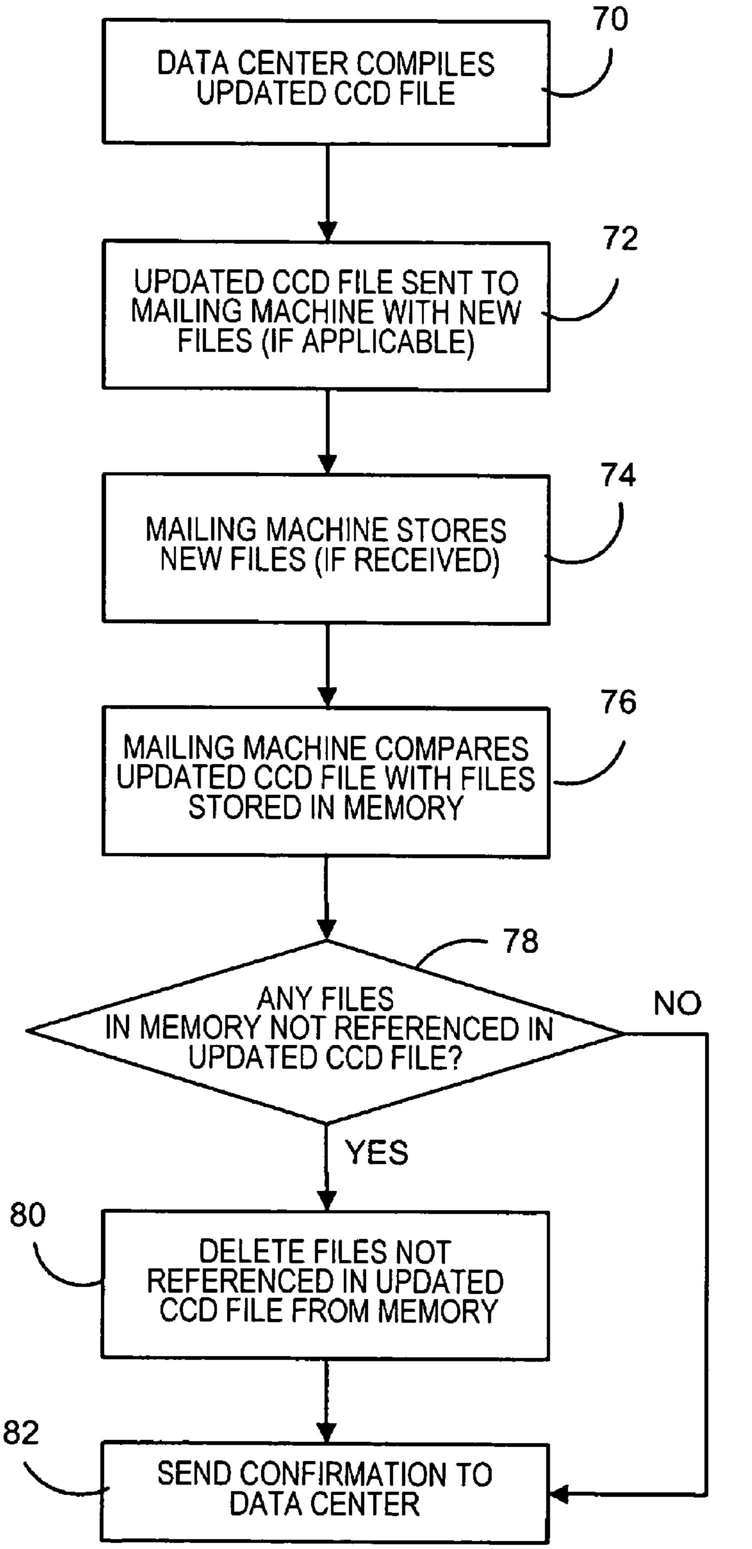
FIG. 2 illustrates in flow chart form an example of the processing performed when the operational features will be remotely changed in a mailing machine.

Referring now to FIG. 2, there is illustrated in flow chart form the processing performed when the operational features will be remotely changed in a mailing machine 12, i.e., the customer desires to add one or more additional operating features supported by the mailing machine 12, upgrade (or downgrade) one or more currently enabled operating features to a higher (or lower) level, or delete one or more operational features currently enabled in the mailing machine 12. When the customer desires to change the operational features of the mailing machine 12, the customer contacts the data center 32 and places an order requesting the change. The customer can place an order, for example, utilizing a telephone network, or on-line utilizing a Web based application. Utilizing the example from above, now suppose, for example, that the customer wishes to upgrade the accounting level from 500 different accounts to 1000 different accounts, add the ability to perform data capture functionality, delete the ability to perform confirmation services for mail pieces processed by the mailing machine 12, and maintain the other operational features, i.e., print ad slogans on the mail pieces processed by the mailing machine 12, and utilize an external platform scale with a fifteen pound maximum capability, without any change.

In step 70, the data center 32 will compile an updated CCD file that includes all of the operational features that the customer has requested, and thus will be obligated to pay for, that should be enabled within the mailing machine 12, based on the order from the customer requesting the change. The updated CCD file can be stored, for example, in the data base 34 and associated with the customer's file. In step 72, after the order is made and processed by the data center 32 and the UIC 16 of mailing machine 12 communicates with the data center 32, the data center 32 will send the updated CCD file to the UIC 16, along with any necessary operating files required to implement and support the order placed by the customer. Preferably, this occurs the first time the mailing machine 12 communicates with the data center 32 after the order has been processed by the data center 32. For example, in the above scenario, the operating files necessary to implement and support the accounting level of 1000 different accounts and the operating files necessary to implement and support the ability to perform data capture functionality will be sent from the data center 32 to the UIC 16 of mailing machine 12 via network 30. It should be understood, of course, that if no new operating files are necessary, such as in the situation where features are only be disabled, then there may not be any operating files sent from the data center 32 to the UIC 16 along with the updated CCD file. Optionally, in step 72, the updated CCD file and/or the necessary operating files required to implement and support the features ordered by the customer can be signed at the data center 32 with a digital signature before they are sent for additional security. Only upon verification of the digital signature by the controller 20 of UIC 16, thereby indicating the download is authentic and authorized by the data center 32, will the UIC 16 continue with the processing of the data from the data center 32.

In step 74, the controller 20 of UIC 16 will store any new operating files (if applicable) received from the data center 32 in the memory 22. These operating files can then be retrieved by the application software for the UIC 16, the files activated, and thus the associated features enabled within the mailing machine 12. Also in step 74, the controller 20 can optionally update the activation status table (if provided) stored in the memory 22 to reflect the changes being made by the customer order. Thus, the status activation table will change the status of any of the features listed thereon to correspond to the updated CCD file received from the data center 32. For example, in the above scenario, the accounting level of 1000 different accounts will be enabled while the accounting level of 500 different accounts will be disabled, the ability to perform data capture will be enabled, and the ability to perform confirmation services will be disabled.

In step 76, the controller 20 will compare the operating files that should be stored in the memory 22, based on the PCNs of the features included in the updated CCD file, with the operating files currently stored in the memory 22. If an operating file is not referenced in the updated CCD file, it means that the operating file is associated with a feature that is not enabled, and therefore should not be present in the memory 22. In step 78, it is determined if there are any operating files stored in the memory 22 that are not referenced in the updated CCD file. For example, in the above scenario, the updated CCD file will include reference to only those operating files that are utilized to implement and support the features requested by the customer, including an accounting level with 1000 different accounts, the ability to perform data capture functionality, the ability to print ad slogans on the mail pieces processed by the mailing machine 12, and the ability to utilize an external platform scale with a fifteen pound maximum capability. The updated CCD file will not reference the operating files necessary to implement and support the features that have been disabled or upgraded, i.e., an accounting level with 500 different accounts and the ability to perform confirmation services.

Since operating files required to implement and support the features that have been disabled or upgraded were previously stored in the memory 22 and will not be referenced in the updated CCD file, then the inquiry in step 78 will result in a yes response and in step 80 the operating files not referenced in the updated CCD file that are resident in the memory 22 are deleted from the memory 22 by, for example, the controller 20, thereby disabling that operational feature with which the deleted operating files are associated. Thus, the only operating files that will be stored in the memory 22 will be those required to implement and support features that are currently enabled within the mailing machine 12. The deletion of operating files from the memory 22 that are no longer necessary provides several advantages. For example, the deletion of any operating files no longer necessary makes additional memory space available for the controller 20 to utilize, which can increase the overall performance of the mailing machine 12. Furthermore, since the unnecessary operating files are no longer stored in the memory 22, the data center 32 will be able to maintain an accurate, up-to-date list of all operating features that are currently enabled within the mailing machine 12 and thus all files that are currently stored in the memory 22 of the UIC 16.

Once the operating files that are no longer required have been deleted from the memory 22, or if in step 78 it is determined that there are not any operating files stored in the memory 22 that are not referenced in the updated CCD file, then optionally in step 82 the UIC 16 can send confirmation to the data center 32 that the updated CCD list and any associated new files were received. It should be noted that if it is desired to reduce the connection time between the data center 32 and UIC 16, step 82 can occur any time after the updated CCD file and associated new operating files are received by the UIC 16, and the processing of the information received from the data center 32 can occur after the communication between the UIC 16 and data center 32 has been terminated. Optionally, step 82 could be performed after the controller 20 has processed the updated CCD file, i.e., stored the new operating files (if applicable) and deleted those operating files no longer necessary, when the UIC 16 next communicates with the data center 32. In this situation, the UIC 16 can provide confirmation to the data center 32 including a list, with the current version number, of the operating files currently stored in the memory 22. Thus, as noted above, the data center 32 will always have an accurate, up-to-date list of all operating features that are currently enabled within the mailing machine 12, and thus all operating files, including the version, that are currently stored in the memory 22 of the UIC 16. This has the advantage of making it easy to determine those machines that may require a download of updated files should a new version of a file be introduced.

Thus, according to embodiments of the present invention, a system and method to remotely enable and disable operating features in a mailing system that is easy to implement, cost effective, and can optimize the memory space in a mailing system is provided. The operating features can be enabled or disabled without the need for a customer service representative to physically visit the location at which the mailing machine is installed, thereby significantly decreasing the time, cost and complexity of changing operating features. Furthermore, since any files that are no longer required are deleted from the memory 22 of the UIC 16, additional memory space is obtained thereby contributing to an increase in the system performance. Since the enabling and disabling of operating features can be performed remotely, embodiments of the present invention allow the mailing system manufacturer to provide customers with different operating features on a trial basis. For example, the data center 32 can enable one or more operating features for the mailing machine 12 for a trial period without charge to the customer. Once the trial period has passed, the features that the customer does not wish to maintain can easily be disabled and all files associated with those features deleted from the memory 22 of the UIC 16. Since there is no visit required by a customer service representative to either enable or disable the operating features, there is little cost incurred by the manufacturer to provide the operating features for the trial period.

While preferred embodiments of the invention have been described and illustrated above, it should be understood that they are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for a mailing machine to change operational features comprising:

establishing a communication link with a remote data center via a network;

receiving from the remote data center, via the communication link, a directory file, the directory file including an indication of all operational features that should be enabled within the mailing machine, each of the operational features having at least one associated operating file required to implement the operational feature;

determining if an operating file stored in a memory of the mailing machine is not associated with an operational feature indicated in the directory file; and deleting any operating files stored in the memory of the mailing machine that are not associated with an operational feature indicated in the directory file, wherein deletion of any operating file stored in the memory of the mailing machine that is not associated with an operational feature indicated in the directory file disables an operational feature with which the deleted operating file is associated.

2. The method of claim 1, further comprising:

receiving from the data center at least one operating file associated with a new operational feature to be enabled in the mailing machine, the directory file including an indication of the new operational feature; and storing the at least one operating file associated with the new operational feature in the memory of the mailing machine.

3. The method of claim 2, further comprising:

sending confirmation to the data center of receipt of the directory file and the at least one operating file associated with the new operational feature.

4. The method of claim 2, further comprising:

activating the at least one operating file associated with the new operational feature, thereby enabling the new operational feature in the mailing machine.

5. The method of claim 2, further comprising:

updating an activation status table stored in the memory of the mailing machine to correspond to the directory file.

6. The method of claim 2, wherein the directory file and at least one operating file are signed at the data center with a digital signature, the method further comprising:

verifying the digital signature, wherein if the digital signature does not verify, processing of the directory file and at least one operating file are not performed.

7. The method of claim 1, wherein operational features include accounting features, postal service features, type and capacity of external scales that can be utilized with the mailing machine, printing of ad slogans, printing of inscriptions, and data capture features.

8. A mailing machine adapted to have operational features remotely changed, the mailing machine comprising:

means for establishing a communication link with a data center via a network to receive from the data center, via the communication link, a directory file, the directory file including an indication of all operational features that should be enabled within the mailing machine, each of the operational features having at least one associated operating file required to implement the operational feature;

means for determining if an operating file stored in a memory of the mailing machine is not associated with an operational feature indicated in the directory file; and means for deleting any operating files stored in the memory of the mailing machine that are not associated with an operational feature indicated in the directory file, wherein deletion of any operating file stored in the memory of the mailing machine that is not associated with an operational feature indicated in the directory file disables an operational feature with which the deleted operating file is associated.

9. The mailing machine of claim 8, further comprising:

means for receiving from the data center at least one operating file associated with a new operational feature to be enabled in the mailing machine, the directory file including an indication of the new operational feature; and means for storing the at least one operating file associated with the new operational feature in the mailing machine.

10. The mailing machine of claim 9, further comprising:

means for sending confirmation to the data center of receipt of the directory file and the at least one operating file associated with the new operational feature.

11. The mailing machine of claim 9, further comprising:

means for activating the at least one operating file associated with the new operational feature, thereby enabling the new operational feature in the mailing machine.

12. The mailing machine of claim 9, further comprising:

an activation status table stored in the memory of the mailing machine; and means for updating the activation status table to correspond to the directory file.

13. The mailing machine of claim 9, wherein the directory file and at least one operating file are signed at the data center with a digital signature, the mailing machine further comprising:

means for verifying the digital signature, wherein if the digital signature does not verify, processing of the directory file and at least one operating file are not performed.

14. The mailing machine of claim 8, wherein operational features include accounting features, postal service features, type and capacity of external scales that can be utilized with the mailing machine, printing of ad slogans, printing of inscriptions, and data capture features.

15. A mailing machine comprising:

a modem adapted to communicate with a remote data center via a network, the mailing machine adapted to receive from the data center a directory file and at least one operating file associated with a new operational feature to be enabled in the mailing machine, the directory file including an indication of all operational features that should be enabled within the mailing machine, each of the operational features having at least one associated operating file required to implement the operational feature;

a memory;

a controller coupled to the modem and memory, the controller adapted to determine if an operating file stored in the memory is not associated with an operational feature indicated in the directory file and delete any operating files stored in the memory that are not associated with an operational feature indicated in the directory file, wherein deletion of any operating file stored in the memory of the mailing machine that is not associated with an operational feature indicated in the directory file disables an operational feature with which the deleted operating file is associated.

16. The mailing machine of claim 15, wherein the controller is further adapted to store the at least one operating file associated with the new operational feature in the memory and activate the at least one operating file associated with the new operational feature, thereby enabling the new operational feature in the mailing machine.

17. The mailing machine of claim 15, wherein the controller is further adapted to send confirmation, utilizing the modem, to the data center of receipt of the directory file and the at least one operating file associated with the new operational feature.

18. The mailing machine of claim 15, further comprising:

an activation status table stored in the memory, wherein the controller is further adapted to update the activation status table to correspond to the directory file.

19. The mailing machine of claim 15, wherein operational features include accounting features, postal service features, type and capacity of external scales that can be utilized with the mailing machine, printing of ad slogans, printing of inscriptions, and data capture features.

* * * * *